(12) United States Patent
Joao

(10) Patent No.: US 9,925,855 B2
(45) Date of Patent: Mar. 27, 2018

(54) COVER APPARATUS AND METHOD FOR VEHICLE WINDOWS AND/OR OTHER VEHICLE COMPONENTS

(71) Applicant: Raymond Anthony Joao, Yonkers, NY (US)

(72) Inventor: Raymond Anthony Joao, Yonkers, NY (US)

( * ) Notice: Subject to any disclaimer, the term of this patent is extended or adjusted under 35 U.S.C. 154(b) by 0 days.

(21) Appl. No.: 14/983,236

(22) Filed: Dec. 29, 2015

(65) Prior Publication Data
US 2016/0200180 A1    Jul. 14, 2016

Related U.S. Application Data

(60) Provisional application No. 62/103,100, filed on Jan. 14, 2015.

(51) Int. Cl.
*B60J 1/20*    (2006.01)
*B60J 11/08*   (2006.01)

(52) U.S. Cl.
CPC ..................................... *B60J 11/08* (2013.01)

(58) Field of Classification Search
CPC . B60J 11/00; B60J 11/02; B60J 11/025; B60J 11/04; B60J 11/06; B60J 11/08
USPC ........................................ 160/370.22, 370.21
See application file for complete search history.

(56) References Cited

U.S. PATENT DOCUMENTS

| | | | | |
|---|---|---|---|---|
| 2,496,085 A | * | 1/1950 | Engelheart | B60J 11/00 135/161 |
| 2,646,097 A | * | 7/1953 | Gaverth | B60J 11/02 135/115 |
| 2,690,928 A | * | 10/1954 | Boynes | B60J 11/08 160/370.21 |
| 2,743,957 A | * | 5/1956 | Sherman | B60J 11/08 160/370.21 |
| 2,751,977 A | * | 6/1956 | Pinkerton | B60J 11/02 135/87 |
| 2,783,082 A | * | 2/1957 | Genua | B60J 11/08 135/115 |
| 2,812,208 A | * | 11/1957 | Francis | B60J 1/002 135/88.05 |

(Continued)

OTHER PUBLICATIONS

Amtrak TravelMall, Spring 1994, Hammacher Schlemmer product.

(Continued)

*Primary Examiner* — Katherine W Mitchell
*Assistant Examiner* — Johnnie A. Shablack
(74) *Attorney, Agent, or Firm* — Raymond A. Joao, Esq.

(57) ABSTRACT

An apparatus, including a sheet for placement over a vehicle window and portion of the roof adjacent the window when deployed. The sheet includes a main portion having a first, second, third, and fourth, side, wherein the first and second sides are positioned opposite one another, the third and fourth sides are positioned opposite one another, the first side extends a first length, the second side a second length, the third side a third length, and the fourth side a fourth length, and each of the first and second lengths are longer than the third and fourth lengths; at least two end portions configured to be closed within a door of the vehicle; and a top portion extending from and along the first side portion. The top portion contains a cavity or passageway extending along a portion of the first side configured to receive a portion of a shaft.

20 Claims, 8 Drawing Sheets

(56) References Cited

U.S. PATENT DOCUMENTS

| | | | | |
|---|---|---|---|---|
| 2,843,421 A * | 7/1958 | Shelton | ............... | B60J 11/08 114/361 |
| 2,956,573 A * | 10/1960 | Rutherford | ............. | B60J 11/08 135/115 |
| 3,026,886 A * | 3/1962 | Francis | ............... | B60J 11/025 135/115 |
| 3,032,045 A * | 5/1962 | Francis | ............... | B60J 11/025 135/115 |
| 3,042,111 A | 7/1962 | Wytovich | | |
| 3,088,772 A * | 5/1963 | Francis | ............... | B60J 11/08 160/370.21 |
| 3,095,034 A * | 6/1963 | Francis | ............... | B60J 11/08 160/369 |
| 3,097,014 A * | 7/1963 | Francis | ............... | B60J 11/08 135/93 |
| 3,411,562 A * | 11/1968 | John | ............... | B60J 1/025 150/168 |
| 3,588,169 A * | 6/1971 | Lunt | ............... | B60J 11/08 160/370.21 |
| 3,763,908 A | 10/1973 | Norman | | |
| 3,874,437 A * | 4/1975 | Black | ............... | B60J 11/08 160/370.21 |
| 3,910,330 A * | 10/1975 | Johnson | ............... | B60J 7/106 150/166 |
| 3,964,780 A * | 6/1976 | Naidu | ............... | B60J 11/08 150/168 |
| 4,049,036 A | 9/1977 | Gebhardt | | |
| 4,597,608 A * | 7/1986 | Duffy | ............... | B60J 11/08 160/370.21 |
| 4,635,993 A * | 1/1987 | Hooper | ............... | B60J 11/08 160/370.21 |
| 4,659,144 A * | 4/1987 | Reese | ............... | B60N 2/6009 108/44 |
| 4,718,711 A * | 1/1988 | Rabbit | ............... | B60J 11/02 296/136.03 |
| 4,801,170 A * | 1/1989 | Moore | ............... | B60J 1/2011 160/370.21 |
| 4,821,785 A | 4/1989 | Rolan | | |
| 4,825,889 A * | 5/1989 | Monteith | ............... | B60J 11/00 135/119 |
| 4,828,319 A * | 5/1989 | Benson | ............... | B60J 11/02 160/23.1 |
| 4,842,324 A * | 6/1989 | Carden | ............... | B60J 11/00 150/166 |
| 4,848,823 A * | 7/1989 | Flohr | ............... | B60J 11/02 160/310 |
| 4,850,635 A * | 7/1989 | Lindell | ............... | B60J 11/02 296/136.03 |
| 4,867,216 A * | 9/1989 | McKee | ............... | B60J 11/00 150/166 |
| 4,889,171 A | 12/1989 | Minimo | | |
| 4,893,668 A * | 1/1990 | Nomura | ............... | B60J 1/2011 160/327 |
| 4,948,191 A * | 8/1990 | Cao | ............... | B60J 11/00 160/370.21 |
| 4,958,881 A | 9/1990 | Piros | | |
| 4,966,405 A * | 10/1990 | Tremaine | ............... | B60J 11/08 160/370.21 |
| 4,973,098 A | 11/1990 | McFall | | |
| 4,997,229 A | 3/1991 | Swanson | | |
| 5,013,079 A * | 5/1991 | Ho | ............... | B60J 11/00 135/133 |
| 5,016,937 A * | 5/1991 | White | ............... | B60J 11/08 160/370.21 |
| 5,036,898 A * | 8/1991 | Chen | ............... | B60J 1/2033 160/23.1 |
| 5,037,156 A | 8/1991 | Lundberg | | |
| 5,056,817 A | 10/1991 | Fuller | | |
| 5,123,468 A * | 6/1992 | Mater, Jr. | ............... | B60J 11/08 150/168 |
| 5,129,678 A | 7/1992 | Gurbacki | | |
| 5,188,417 A * | 2/1993 | Curchod | ............... | B60J 11/00 150/166 |
| 5,193,877 A | 3/1993 | George, Jr. | | |
| 5,195,778 A | 3/1993 | Dismuke | | |
| 5,273,316 A | 12/1993 | Infante | | |
| 5,275,460 A * | 1/1994 | Kraus | ............... | B60J 11/06 150/166 |
| 5,292,167 A * | 3/1994 | Hellman | ............... | B60J 11/08 150/168 |
| 5,294,167 A * | 3/1994 | Yu | ............... | B60J 11/02 160/24 |
| 5,332,278 A * | 7/1994 | Berry | ............... | B60J 11/08 135/90 |
| 5,356,191 A * | 10/1994 | Sheehan | ............... | B60J 11/08 150/168 |
| 5,364,156 A * | 11/1994 | Zerow | ............... | B60J 11/00 296/136.13 |
| 5,409,286 A * | 4/1995 | Huang | ............... | B60J 11/00 150/166 |
| 5,415,214 A * | 5/1995 | Bock | ............... | B60J 11/08 150/168 |
| 5,435,362 A | 7/1995 | Chiang | | |
| 5,443,923 A * | 8/1995 | Laniado | ............... | B60J 1/2041 156/229 |
| 5,456,515 A * | 10/1995 | Dang | ............... | B60J 11/025 150/166 |
| 5,518,289 A * | 5/1996 | Cobble | ............... | B60J 11/00 135/93 |
| 5,557,811 A * | 9/1996 | Hoff | ............... | B65H 18/10 242/388.1 |
| 5,638,642 A * | 6/1997 | Nemec | ............... | B60J 11/00 150/166 |
| 5,664,825 A * | 9/1997 | Henke | ............... | B60J 11/00 150/166 |
| 5,694,998 A * | 12/1997 | Chen | ............... | B60J 1/2011 160/327 |
| 5,697,416 A * | 12/1997 | Bock | ............... | B60J 11/08 150/168 |
| D396,843 S * | 8/1998 | Mifsud | ............... | D12/401 |
| 5,823,607 A * | 10/1998 | Hindson | ............... | B60J 11/02 160/370.21 |
| 5,860,466 A * | 1/1999 | Kao | ............... | B60J 1/2072 160/23.1 |
| 5,930,956 A * | 8/1999 | Trosper | ............... | E04G 21/30 118/504 |
| 5,938,263 A * | 8/1999 | Barthelman | ............... | B60J 11/06 296/37.6 |
| 5,941,593 A * | 8/1999 | McCann | ............... | B60J 11/02 296/136.1 |
| 5,941,594 A * | 8/1999 | O'Neill | ............... | B60J 11/00 150/166 |
| 6,012,759 A * | 1/2000 | Adamek | ............... | B60J 11/02 296/136.03 |
| 6,044,891 A * | 4/2000 | Guo | ............... | B60J 1/2011 160/370.21 |
| 6,076,577 A * | 6/2000 | Ontaneda | ............... | B60J 11/08 150/168 |
| 6,079,474 A * | 6/2000 | Lin | ............... | B60J 1/205 160/262 |
| 6,089,245 A * | 7/2000 | Tseytlin | ............... | B60J 11/08 135/117 |
| 6,125,908 A * | 10/2000 | Ament | ............... | B60R 5/047 160/323.1 |
| 6,131,643 A * | 10/2000 | Cheng | ............... | B60J 11/02 160/24 |
| 6,220,648 B1 * | 4/2001 | Daniel | ............... | B60J 11/00 296/136.02 |
| 6,427,709 B1 * | 8/2002 | Montes | ............... | B60J 11/00 135/88.05 |
| 6,513,853 B2 * | 2/2003 | Langley | ............... | B60J 11/08 160/370.21 |
| 6,578,900 B1 * | 6/2003 | Riportella | ............... | B60J 11/08 150/166 |
| 6,598,653 B1 * | 7/2003 | Gonzalez | ............... | B60J 11/08 160/265 |

(56) References Cited

U.S. PATENT DOCUMENTS

| | | | | |
|---|---|---|---|---|
| 6,607,235 B2 * | 8/2003 | McGrath, Jr. | B60J 11/00 | 135/88.09 |
| 6,640,395 B2 * | 11/2003 | Bush | B60J 11/00 | 24/68 CD |
| 6,648,396 B2 * | 11/2003 | Monahan | B60J 1/2011 | 160/370.21 |
| 6,672,643 B1 * | 1/2004 | Brodskiy | B60J 11/02 | 296/136.01 |
| 6,758,003 B2 * | 7/2004 | Zheng | G09F 17/00 | 116/173 |
| 6,779,827 B2 * | 8/2004 | Clark | B60J 11/04 | 296/136.01 |
| 6,964,446 B2 * | 11/2005 | Porter | B60J 11/02 | 150/166 |
| 6,997,503 B2 * | 2/2006 | Fukagawa | B60J 11/02 | 150/166 |
| 7,059,650 B1 * | 6/2006 | Wood | B60J 11/08 | 296/95.1 |
| 7,213,868 B1 * | 5/2007 | Tan | B60J 11/00 | 296/136.04 |
| 7,240,684 B2 * | 7/2007 | Yang | B60J 11/00 | 135/88.07 |
| 7,314,079 B2 * | 1/2008 | Yano | B60J 1/2027 | 160/265 |
| D582,483 S * | 12/2008 | Awan | D12/400 | |
| D665,721 S * | 8/2012 | Beachy | D12/401 | |
| 8,430,445 B1 * | 4/2013 | Williams | B60J 11/08 | 150/168 |
| 8,496,267 B2 * | 7/2013 | Wohlberg | B60J 11/06 | 280/770 |
| 8,584,719 B2 * | 11/2013 | Rodriguez | B60J 11/06 | 150/154 |
| 8,608,223 B2 * | 12/2013 | Taylor | B60J 11/02 | 296/136.01 |
| 8,651,166 B1 * | 2/2014 | Daniels | E06B 9/44 | 160/238 |
| 8,656,968 B2 * | 2/2014 | Lin | B60J 11/08 | 150/168 |
| 8,757,697 B2 * | 6/2014 | Held | B60R 5/047 | 160/120 |
| 8,800,581 B1 * | 8/2014 | McMaster | B60J 11/04 | 135/88.05 |
| 8,960,212 B2 * | 2/2015 | Majer | B60J 11/00 | 135/88.07 |
| 9,248,730 B2 * | 2/2016 | Hu | B60J 11/04 | |
| 2001/0045758 A1 * | 11/2001 | Vieira-Soares | B60J 11/00 | 296/98 |
| 2002/0157696 A1 * | 10/2002 | O'Brien | B60J 11/00 | 135/87 |
| 2003/0038497 A1 * | 2/2003 | Fitzgerald | B60R 5/04 | 296/39.1 |
| 2005/0242558 A1 * | 11/2005 | Cohen | B60R 5/04 | 280/770 |
| 2006/0232095 A1 * | 10/2006 | Sedighzadeh | B60J 11/02 | 296/98 |
| 2007/0102126 A1 * | 5/2007 | Yamamura | B60J 1/2025 | 160/370.21 |
| 2007/0177265 A1 * | 8/2007 | Focardi | B60J 11/025 | 359/509 |
| 2007/0216193 A1 * | 9/2007 | Webber | B60J 11/00 | 296/136.01 |
| 2008/0203745 A1 * | 8/2008 | Rodriguez | B60J 11/06 | 293/142 |
| 2009/0072578 A1 * | 3/2009 | Wang | B60J 11/06 | 296/136.12 |
| 2009/0102230 A1 * | 4/2009 | Pehrson | B60J 11/08 | 296/136.13 |
| 2012/0037321 A1 * | 2/2012 | Pham | E06B 9/44 | 160/121.1 |
| 2013/0118659 A1 * | 5/2013 | Zhou | B60J 11/04 | 150/166 |
| 2016/0031295 A1 * | 2/2016 | Maier | B60J 1/2011 | 160/370.21 |
| 2016/0200180 A1 * | 7/2016 | Joao | B60J 11/08 | 160/370.21 |

OTHER PUBLICATIONS

Sun and Snow Shade, Brookstone (publication, cover page and date unavailable).

Carol Wright Gifts, 1994, Magnetic Heavy Duty Windshield Cover (publication, cover page and date unavailable).

* cited by examiner

COVER APPARATUS AND METHOD FOR VEHICLE WINDOWS AND/OR OTHER VEHICLE COMPONENTS

RELATED APPLICATIONS

This application claims the benefit of the priority of U.S. Provisional Patent Application Ser. No. 62/103,100, filed Jan. 14, 2015, and entitled "COVER APPARATUS AND METHOD FOR VEHICLE WINDOWS AND/OR OTHER VEHICLE COMPONENTS", the subject matter and teachings of which are hereby incorporated by reference herein in their entirety.

FIELD OF THE INVENTION

The present invention pertains to a cover apparatus and method for vehicle windows and/or other vehicle components and, in particular, the present invention pertains to a cover apparatus for vehicle windows and/or other vehicle components, such as, but not limited to, vehicle lights and/or other components, which can be easily applied for use and/or which can be easily removed from a vehicle, a vehicle window, or another vehicle component.

BACKGROUND OF THE INVENTION

Windshield covers and window covers for vehicles have been known in the prior art and have been available in the marketplace for allowing an individual to cover the windshield of his or her vehicle before a snow storm or other inclement weather as a means by which to effectuate easy removal of snow and/or ice from the windshield prior to using the vehicle. Such products have been designed to, among other things, dispense with the need to remove snow or ice from windows. Such windshield covers can also be used in warm weather to reduce heat buildup in a vehicle, prevent sun damage, or for providing privacy. These prior art windshield covers can typically be placed upon a vehicle so as to cover the windshield and are typically attached with the vehicle in some manner.

These prior art windshield covers, however, are cumbersome and difficult to use, especially on larger vehicles. These prior art windshield covers typically require that they be applied on or over the entire windshield prior to attaching them or affixing them on to or on the vehicle. Such application can be difficult and cumbersome when used by shorter or smaller individuals or when used in connection with larger vehicles, sport utility vehicles, and/or trucks. As a result, individuals typically dispense with using same.

SUMMARY OF THE INVENTION

The present invention pertains to a cover apparatus and method for vehicle windows and/or other vehicle components and, in particular, the present invention pertains to a cover apparatus for vehicle windows and/or other vehicle components, such as, but not limited to, vehicle lights and/or other components, which can be easily applied for use and/or which can be easily removed from a vehicle, a vehicle window, or another vehicle component and which overcomes the shortcomings of the prior art.

The cover apparatus of the present invention can include a sheet which can have any appropriate shape or size and which can be made of any suitable material such as, for example, but not limited to, a plastic material, a vinyl material, a cloth material, a flannel material, a canvas material, or any other material, or any combination of the same arranged in layers. The sheet should be made of a material which should be strong enough and durable enough so that it can withstand a fair to large accumulation of snow and ice thereon and can be strong enough and sturdy enough so that it can withstand the removal of same from a vehicle windshield or window even though a fair to large amount of snow and ice may be accumulated thereon. The sheet should also be strong enough and durable enough to withstand high temperatures such as well used in hot weather or in direct sunlight as and for a sunscreen.

The sheet of the cover apparatus can include a main region portion which can be sized so as to be larger than, and so as to completely cover, a vehicle windshield and at least a portion or portions of the vehicle adjacent to, or surrounding, the vehicle windshield. The sheet can include an end region portion on each side end thereof which can have or be of any appropriate or suitable shape and/or size. The cover apparatus can also include a handle which can be attached to, or formed within, at least one end region portion. The cover apparatus includes a cutout in, and/or a handle, on or at, each end region portion. The handle, if used, can be positioned adjacent to the cutout and can be used to facilitate easy handling of the cover apparatus.

The sheet can also include, at a top end portion of the main region portion thereof, a top portion which can include a portion enclosing an interior cavity or passageway which can run or extend along at least a portion thereof and along a top end portion of the sheet. The top portion can have an opening on one or both ends of same in order to facilitate placement of a shaft or a handle component within the cavity or passageway. The cover apparatus can include a support handle which can have at least a portion thereof which can be inserted into and/or withdrawn from the interior cavity or passageway of the top portion.

The support handle can include a shaft and a handle which can be attached to the shaft. The shaft can be implemented or made by using a wooden or plastic, or other material, handle, such as for example, a wooden or plastic broomstick handle or any other suitable cylindrical or elongated structure, device, or component, and/or it can be made of wood, plastic, metal, or any other suitable material, or any combination of same. The handle can be any suitable handle, such as for example, a snow shovel handle which can be made in any suitable shape or form and which can be attached in any suitable manner to the shaft. The shaft can be of a fixed length. The shaft can also be a telescopic shaft which can be extendable in size lengthwise and/or which can be retractable and decreased in size lengthwise.

One end of the top portion can be open so as to allow for an insertion and/or a removal of the shaft of the support handle into the cavity or passageway. The opposite end of the top portion can be sealed so as to prevent any insertion or any removal of anything into or from that end of the top portion. Both ends of the top portion can also be open. Both ends of the top portion can also be sealed with a shaft sealed within the cavity or passageway.

The shaft of the support handle can also be repeatedly inserted into and withdrawn from the cavity or passageway of the top portion when using the cover apparatus of the present invention. The use of the support handle can facilitate easy handing, placement, manipulation, and/or removal, of the cover apparatus. In this regard, the support handle, when placed inside the cavity or passageway of the top portion can facilitate easy placement of the cover apparatus on the vehicle, can facilitate easy handling and/or manipulation of same, and/or can facilitate easy removal of the cover apparatus from the vehicle.

The sheet can be constructed of a single layer or material, or of single ply material, with the top portion being formed by sewing, sealing, or otherwise attaching a terminal portion of the top portion material to the reverse side of the sheet so as to form a seam or a seal. The sheet can be constructed of a double layer or material with the top portion being formed by joining the sheet together with a seam or seal so as to form the top portion and the cavity or passageway.

The cover apparatus can also include any number of attachment elements which can be attached to the rear side of the sheet so as to facilitate fastening the cover apparatus to the vehicle. The attachment elements can be strips of hook and fastener type elements, or strips of VELCO®, which can be joined to corresponding fasteners which can be affixed to, or attached to, the vehicle. Any other type or kind of attachment element(s) can be used to assist in securing the cover apparatus to the vehicle. The cover apparatus can also have magnets or flexible magnetic strips which can attached or secured thereto which can also be used to assist in attaching the cover apparatus to the vehicle.

The cover apparatus of the present invention can also include a sheet handle which can be made of the same material as the sheet, or can be made of any other flexible material, or can be a solid material handle, which can be attached to, or connected to, or formed integrally therewith, the top portion or any other portion or region of the sheet.

The cover apparatus of the present invention can also have a cover handle attached, or connected thereto. The cover handle can be utilized to manipulate the cover apparatus in any suitable or appropriate manner. The cover handle can be attached to, or connected to, the sheet and/or to the cover apparatus at any location thereof or thereon.

The cover apparatus can also equipped a telescopic shaft. The telescopic shaft can have a handle attached thereto or connected thereto. The telescopic shaft can be expandable to an in-use length and/or can be compressible to a shorter length for facilitating easier storage and/or handling of the telescopic shaft and the cover apparatus. The telescopic shaft can be equipped with a spring-loaded mechanism such as are typically found in umbrellas for expanding the length of same when desired and/or for compressing same to a non-use or storage position when desired.

When it is desired to compress the telescopic shaft, such can be accomplished in a manner typically used when closing an umbrella.

The cover apparatus of the present invention can be utilized with any type, kind, or size, of motor vehicle, automobile, truck, van, passenger vehicle, commercial vehicle, or any other vehicle.

When it is desired to apply the cover apparatus to a vehicle, a user can place the shaft of the support handle into the cavity or passageway of the top portion of the sheet. In this manner, the user can create a rigid and straight top portion of the sheet of the cover apparatus which can allow the user to more easily handle the cover apparatus. The user can then, by holding the cover apparatus by the handle of the support handle, maneuver the cover apparatus so as to place the top portion of same on the top of the vehicle at an appropriate location on the vehicle roof and above the vehicle windshield. In this manner, the use of the support handle, in conjunction with the cover apparatus, allows for an easier positioning and placement of the cover apparatus on the vehicle roof and over the vehicle windshield. If the cover apparatus is equipped with a cover handle, the user can also grasp the cover handle in manipulating and/or in positioning the cover apparatus on the vehicle roof and over the vehicle windshield.

When attachment elements are utilized on or in connection with the cover apparatus, the vehicle can be equipped with corresponding attachment elements which can mate with, or which can connect with, the attachment elements of the cover apparatus. In this regard, when used in connection with attachment elements, the user can align or position the cover apparatus so that the attachment elements can be lined up with one another so as to mate with or to connect with one another.

Once the cover apparatus has been applied to and/or positioned so that it covers the vehicle windshield, the user can, if desired, remove the shaft of the support handle from the cavity or passageway of the top portion. The support handle can then be stored, if desired. Removal of the support handle can also be desired in order to allow for an easy removal of the cover apparatus, as the cover apparatus, with the support handle removed from the cavity or passageway, will be flexible and easy to pull off of the vehicle.

Once the cover apparatus has been applied to and/or positioned so that it covers the vehicle windshield, the user can then open each front door of the vehicle, place the end region portion adjacent to each door inside the passenger compartment of the vehicle door and close the door on the respective end portion so as to secure each end portion of the sheet, and the cover apparatus, to the vehicle.

The cover apparatus of the present invention can be utilized to protect a vehicle windshield from snow and ice so as to facilitate an easy clearing and/or cleaning of same after a snow event, an ice event, a rain event, or a freezing rain event. In this regard, the cover apparatus can be placed on the vehicle before the snow event, the ice event, the rain event, or the freezing rain event. When it is desired to use the vehicle, or to simply clear the vehicle windshield, the user can simply open each vehicle from door and remove the end portions form the passenger compartment and lift and/or remove the cover apparatus from the vehicle. The user can simply lift and/or remove the cover apparatus by grasping any portion of same. The user can also grasp the handle of the support handle in order to maneuver the cover apparatus from the vehicle. If the support handle had been previously removed, the user can reinsert the support handle into the cavity or passageway of the top portion prior to using the handle of the support handle to remove the cover apparatus. If the cover apparatus is equipped with the cover handle, the user can use the cover handle and/or the handle of the support handle to remove the cover apparatus.

The cover apparatus of the present invention can also be used in the hot weather to provide a sunshade for the vehicle by placing the cover apparatus over the vehicle windshield so as to prevent heat buildup in the car and/or so as to prevent sun damage to any portion of the vehicle interior.

The cover apparatus of the present invention, by providing a handle support for use in connection with same, facilitates an easier manipulation, placement, and/or positioning, of the cover apparatus on the vehicle and on and over the vehicle windshield. The cover apparatus of the present invention can be utilized so as to dispense with the cumbersome activity of having to place and hold a cover over the vehicle windshield when trying the apply same to a vehicle.

A logo or an advertisement can also be placed on the front of the sheet of the cover apparatus in order to allow one to utilize the cover apparatus as and for an advertisement and/or for advertising purposes.

The cover apparatus of the present invention can be used to provide protection for vehicle windshields which is quick and easy to use. The cover apparatus of the present invention can also be adapted for use to provide protection and cover for rear windows, side windows, sunroofs, moon roofs, front lights, and/or rear lights.

The cover apparatus of the present invention can be manufactured to have a shell which can contain one or more exterior side layers of material and/or one or more interior side layers of material. The cover apparatus can be manufactured to have a soft and/or flannel-like material on its interior side so as to prevent causing scratches to the vehicle and/or to the vehicle windshield.

The sheet can be manufactured from, or can include, a single layer of material, which can be a cloth material, a cloth fabric, a canvas material, a canvas fabric, a plastic material, or a vinyl material, or any other suitable material or fabric or any combination of same. The sheet can also by manufactured from, or can include, a plurality of, or any number of, layers of material, which can include, but not be limited, a cloth material, a cloth fabric, a canvas material, a canvas fabric, a plastic material, or a vinyl material, a flannel material or fabric, a rubber material, a cotton material or fabric, or polyester material or fabric, or any other suitable material or fabric or any combination or combinations of same.

The cover apparatus of the present invention can contain any type or kind of an advertisement or a logo anywhere on the sheet, on the cover apparatus, or on any component of same.

The cover apparatus of the present invention can also include, or can be utilized in conjunction with, any type of kind of attachment devices, elements, or systems, including, but not limited to, hook and loop fastening elements or systems, a strip(s) of VELCRO®, a magnet(s), a magnetic strip(s), or a flexible magnetic strip(s), for aiding in and/or for facilitating securing the cover apparatus to a vehicle.

The cover apparatus of the present invention can be adapted for, and can be utilized for, covering vehicle windshields, side windows, rear windows, moon roofs, sunroofs, lights, indicator lamps, and/or any other vehicle component or device.

DESCRIPTION OF THE PREFERRED EMBODIMENTS

The present invention pertains to a cover apparatus and method for vehicle windows and/or other vehicle components and, in particular, the present invention pertains to a cover apparatus for vehicle windows and/or other vehicle components, such as, but not limited to, vehicle lights and/or other components, which can be easily applied for use and/or which can be easily removed from a vehicle, a vehicle window, or another vehicle component.

Applicant hereby incorporates by reference herein the subject matter and teachings of U.S. Provisional Patent Application Ser. No. 62/103,100, filed Jan. 14, 2015, and entitled "COVER APPARATUS AND METHOD FOR VEHICLE WINDOWS AND/OR OTHER VEHICLE COMPONENTS", the subject matter and teachings of which are hereby incorporated by reference herein in their entirety.

Figure 1:
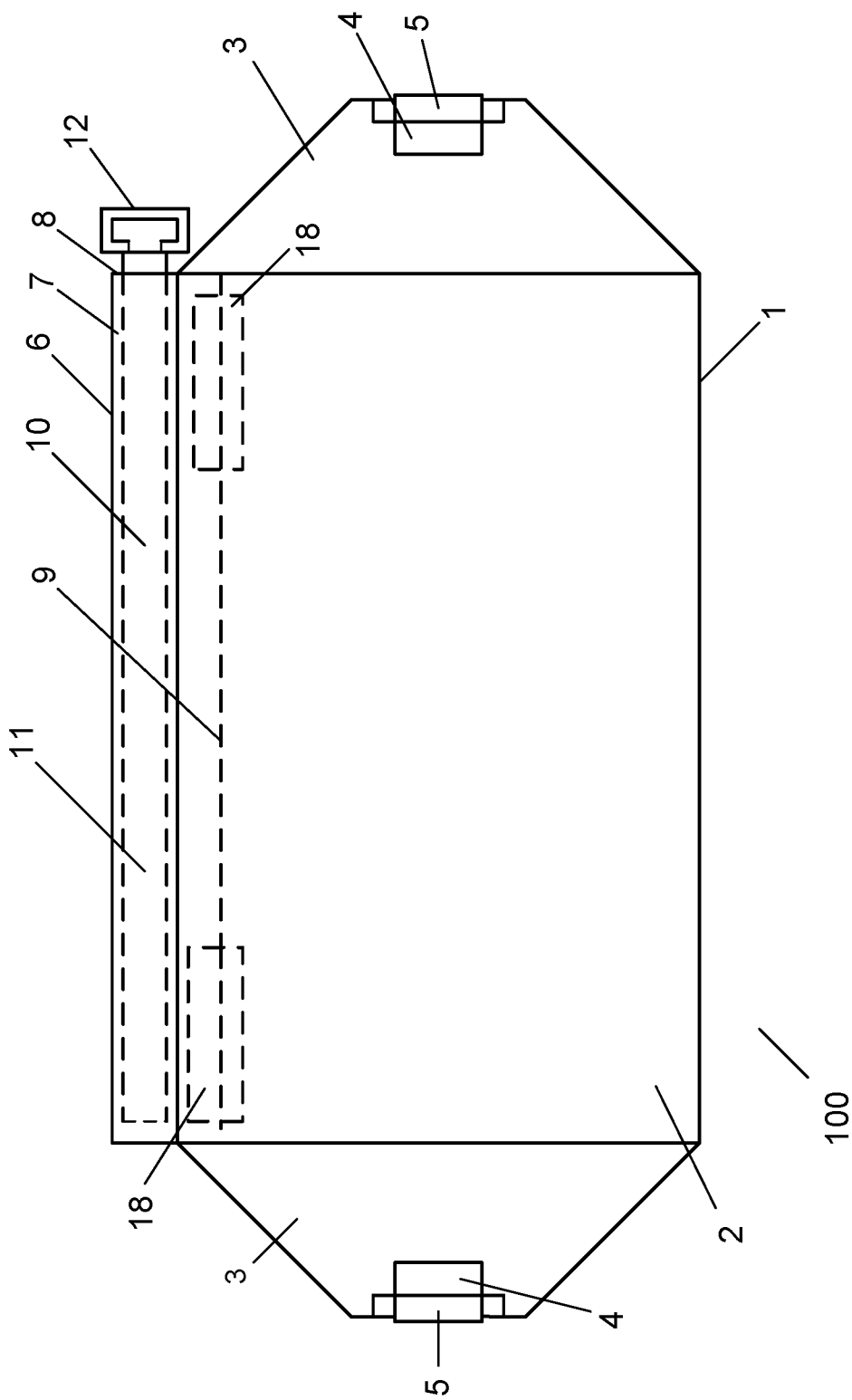
FIG. 1 illustrates a front side view of a preferred embodiment of the cover apparatus of the present invention.

FIG. 1 illustrates a front side view of a preferred embodiment of the cover apparatus of the present invention which is denoted generally by the reference numeral 100. With reference to FIG. 1, the cover apparatus 100 includes a sheet 1. In a preferred embodiment, the sheet 1 can be shaped, as shown, or can have any other suitable shape, and can be made of any suitable material such as, for example, but not limited to, a plastic material, a vinyl material, a cloth material, a flannel material, a canvas material, or any other material, or any combination of the same arranged in layers. In a preferred embodiment, the sheet 1 should be made of a material which should be strong enough and durable enough so that it can withstand a fair to large accumulation of snow and ice thereon and can be strong enough and sturdy enough so that it can withstand the removal of same from a vehicle windshield or window even though a fair to large amount of snow and ice may be accumulated thereon. In a preferred embodiment, the sheet 1 should be strong enough and durable enough to withstand high temperatures such as when used in hot weather or in direct sunlight as and for a sunscreen. The sheet 1 can have any appropriate shape and/or size.

With reference once again to FIG. 1, the sheet 1 includes a main region portion 2 which, in a preferred embodiment, can be sized so as to be larger than, and so as to completely cover, a vehicle windshield and at least a portion or portions of the vehicle adjacent to, or surrounding, the vehicle windshield. With reference once again to FIG. 1, the sheet 1 can include an end region portion 3 on each side end thereof, as shown in FIG. 1. The end region portions 3 can have any appropriate or suitable shape and/or size. In a preferred embodiment, the cover apparatus 300 can also include a handle 5 which can be attached to, or formed within, at least one end region portion 3. With reference to the preferred embodiment of FIG. 1, the cover apparatus 100 includes a cutout 4 in, and a handle 5 on or at, each end region portion 3, as shown. In a preferred embodiment of FIG. 1, the handle 5 is positioned adjacent the cutout 4 and can be used to facilitate easy handling of the cover apparatus 100.

With reference once again to FIG. 1, the sheet 1 also includes, at a top end portion of the main region portion 2 thereof, a top portion 6, as shown, which includes a longitudinal portion enclosing an interior cavity or passageway 7 which runs or extends along at least a portion thereof and along a top end portion of the sheet 1. In a preferred embodiment, the top portion 6 can have an opening on one or both ends 8 of same in order to facilitate placement of a shaft or a handle component within the cavity or passageway 7. In a preferred embodiment, the cover apparatus 100 also includes a support handle 10 which can have at least a portion thereof which can be inserted into and/or withdrawn from the interior cavity or passageway 7 of the top portion 6.

In a preferred embodiment, the support handle 10 can include a shaft 11 and a handle 12 attached to the shaft 11. In a preferred embodiment, the shaft 11 can be a wooden handle or a plastic handle, or a handle made of any other suitable material, such as for example, a wooden or plastic broomstick handle or any other suitable cylindrical or elongated structure, device, or component, and it can be made of wood, plastic, metal, or any other suitable material, or any combination of same. In a preferred embodiment, the handle 12 can be any suitable handle, such as for example, a snow shovel handle which can be made in any suitable shape or form and which can be attached in any suitable manner to the shaft 11. In a preferred embodiment, the shaft 11 can be of a fixed length. In another preferred embodiment, the shaft 11 can also be a telescopic shaft which can be extendable in size lengthwise and/or which can be retractable and decreased in size lengthwise.

In a preferred embodiment, one end of the top portion 6 is open so as to allow for an insertion and/or a removal of the shaft 11 of the support handle 10 into the cavity or passageway 7. In a preferred embodiment, the opposite end of the top portion 6 can be sealed so as to prevent any insertion or any removal of anything into or from that end of the top portion 6. In another preferred embodiment, both ends of the top portion 6 can be open. In still another preferred embodiment, both ends of the top portion 6 can be sealed with a shaft 11 sealed within the cavity or passageway 7.

In a preferred embodiment, such as in the preferred embodiment of FIG. 1, the shaft 11 of the support handle 10 can be repeatedly inserted into and withdrawn from the cavity or passageway 7 of the top portion when using the cover apparatus 100 of the present invention. In a preferred embodiment, the use of the support handle 10 can facilitate easy handing, placement, manipulation, and/or removal, of the cover apparatus 100. In this regard, the support handle 10, when placed inside the cavity or passageway 7 of the top portion 6, as shown in FIG. 1, can facilitate easy placement of the cover apparatus 100 on the vehicle, can facilitate easy handling and/or manipulation of same, and/or can facilitate easy removal of the cover apparatus 100 from the vehicle.

In a preferred embodiment, the sheet 1 can be constructed of a single layer or material, or of single ply material, with the top portion 6 being formed by sewing, sealing, or otherwise attaching a terminal portion of the top portion material to the reverse side of the sheet 1 so as to form a seam 9 or a seal 9. In another preferred embodiment, the sheet 1 can be constructed of a double layer or material with the top portion 6 being formed by joining the sheet 1 together with a seam 9 or seal 9 so as to form the top portion 6 and the cavity or passageway 7.

With reference once again to FIG. 1, the cover apparatus 100 can also include any number of attachment elements 18 which, in a preferred embodiment, can be attached to the rear side of the sheet 1 so as to facilitate fastening the cover apparatus 100 to the vehicle. In a preferred embodiment, the attachment elements can be strips of hook and fastener type elements, or strips of VELCO®, which can be joined to corresponding fasteners which can be affixed to, or attached to, the vehicle. In another preferred embodiment, any other type or kind of attachment element(s) can be used to assist in securing the cover apparatus 100 to the vehicle. In another preferred embodiment, the cover apparatus 100 can also have magnets or flexible magnetic strips which can attached or secured thereto which can also be used to assist in attaching the cover apparatus 100 to the vehicle.

Figure 2:
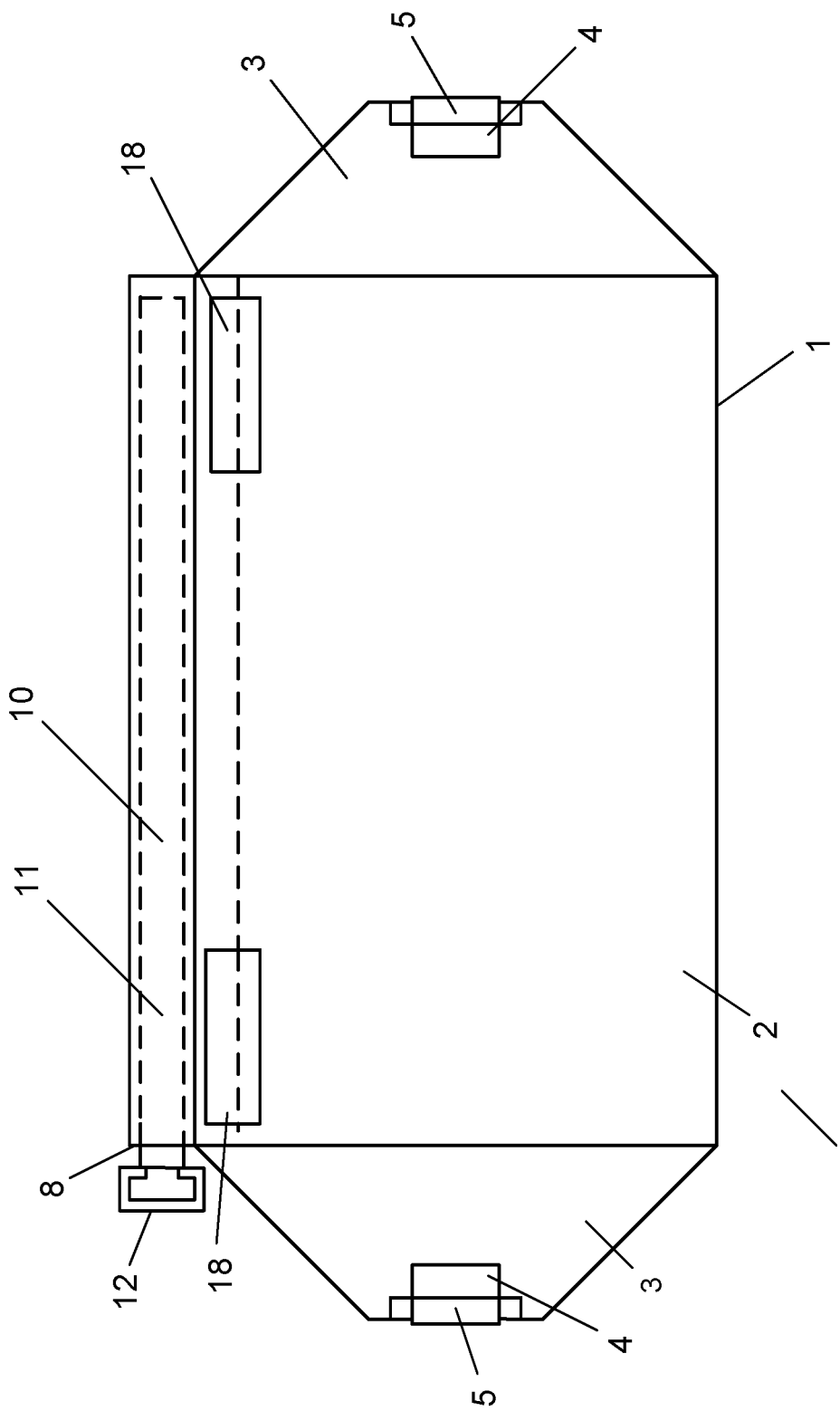
FIG. 2 illustrates a rear side view of the cover apparatus of FIG. 1.

FIG. 2 illustrates a rear side view of the cover apparatus 100 illustrating the attachment elements 18.

Figure 3:
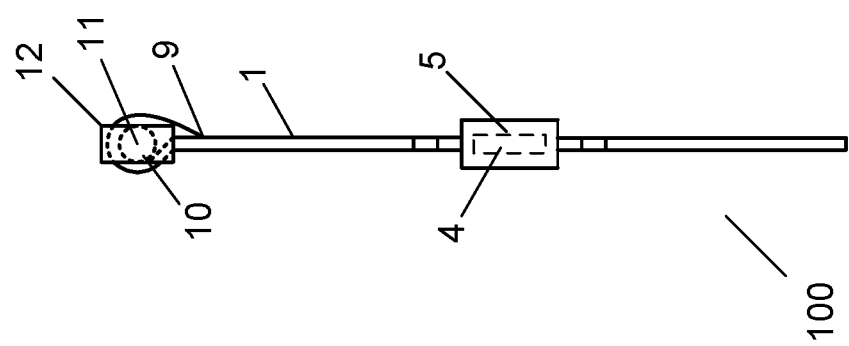
FIG. 3 illustrates a right side view of the cover apparatus of FIG. 1.

FIG. 3 illustrates a right side view of the cover apparatus 100 of FIG. 1 illustrating the designated elements of same.

In another preferred embodiment, the cover apparatus 100 can also include a sheet handle 15 which, in a preferred embodiment, can be made of the same material as the sheet 1, or can be made of any other flexible material, or can be a solid material handle, which can be attached to, or connected to, or formed integrally therewith, the top portion 6 or any other portion or region of the sheet 1.

Figure 4:
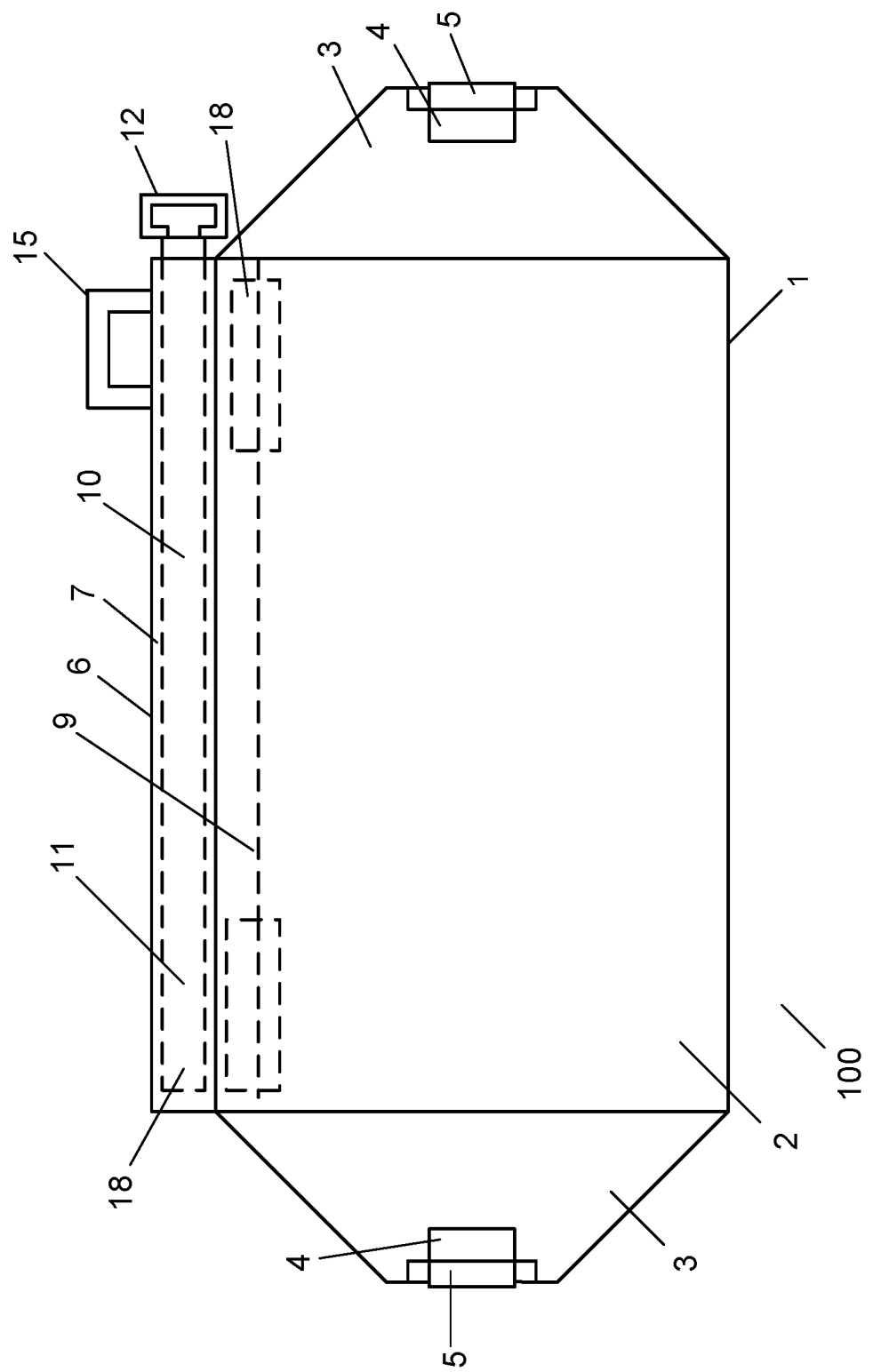
FIG. 4 illustrates another preferred embodiment of the cover apparatus of the present invention.

FIG. 4 illustrates another preferred embodiment of the cover apparatus 100 of the present invention which has a cover handle 15 attached, or connected, thereto, as shown. In a preferred embodiment, the cover handle 15 can be utilized to manipulate the cover apparatus 100 in any suitable or appropriate manner. In another preferred embodiment, the cover handle 15 can be attached to, or connected to, the sheet 1 and/or to the cover apparatus 100 at any location thereof or thereon.

Figure 5:
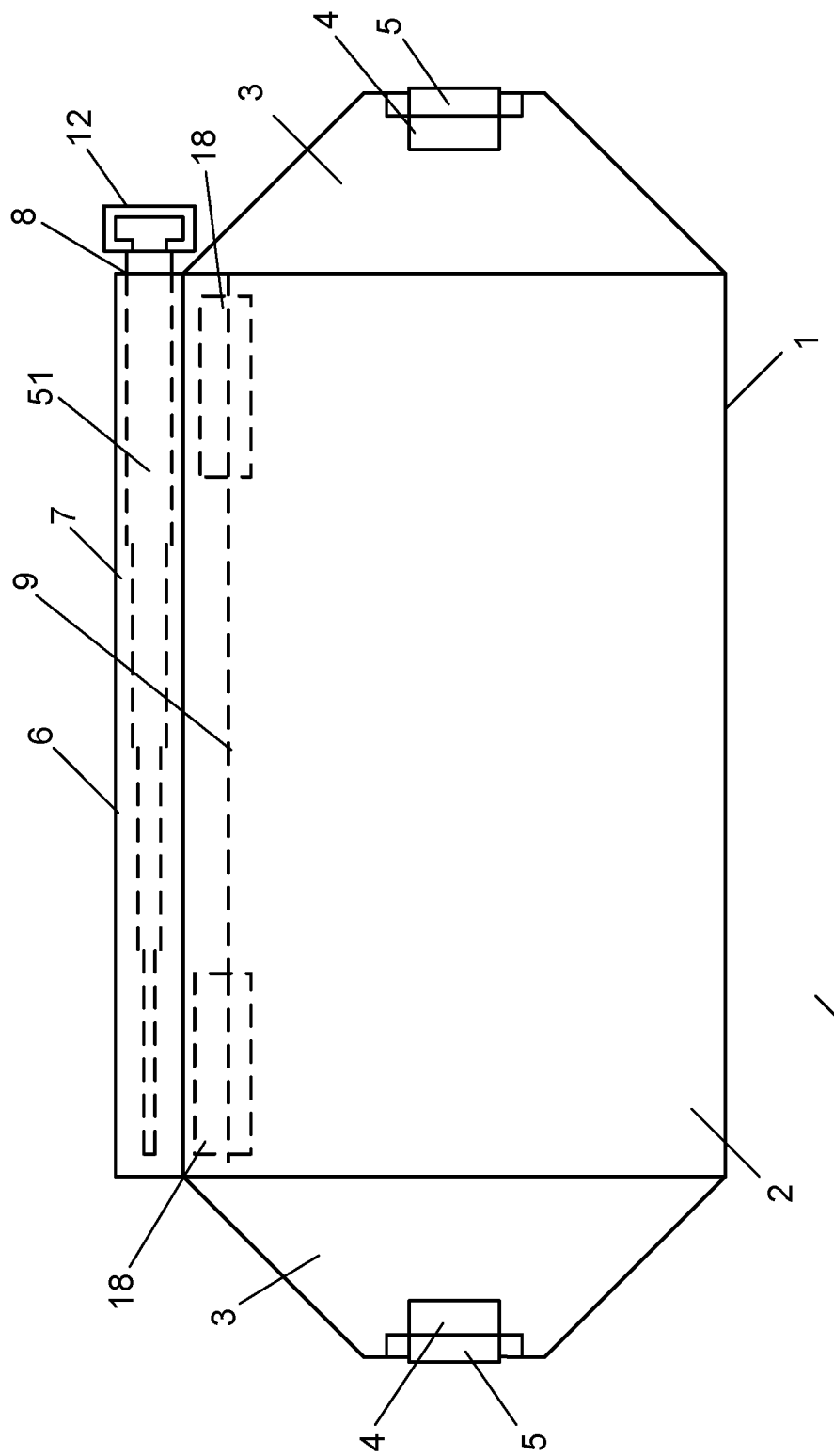
FIG. 5 illustrates another preferred embodiment of the cover apparatus of the present invention.

FIG. 5 illustrates another preferred embodiment of the cover apparatus of the present invention which is denoted generally by the reference numeral 200. With reference to FIG. 5, the cover apparatus 200 contains all of the components of the cover apparatus 100 with the exception of a fixed length shaft 11. The cover apparatus 200 of FIG. 5, instead, includes a telescopic shaft 51. The telescopic shaft 51 can have a handle 52 attached thereto or connected thereto, as shown. The cover apparatus 200 provides for an apparatus having a telescopic shaft 51 which can be expandable to an in-use length and/or can be compressible to a shorter length for facilitating easier storage and/or handling of the telescopic shaft 51 and the cover apparatus 200. In a preferred embodiment, the telescopic shaft 51 can be equipped with a spring-loaded mechanism such as are typically found in umbrellas for expanding the length of same when desired and/or for compressing same to a non-use or storage position when desired. FIG. 5 illustrates the cover apparatus 200 when the telescopic shaft 51 is fully deployed lengthwise.

Figure 6:
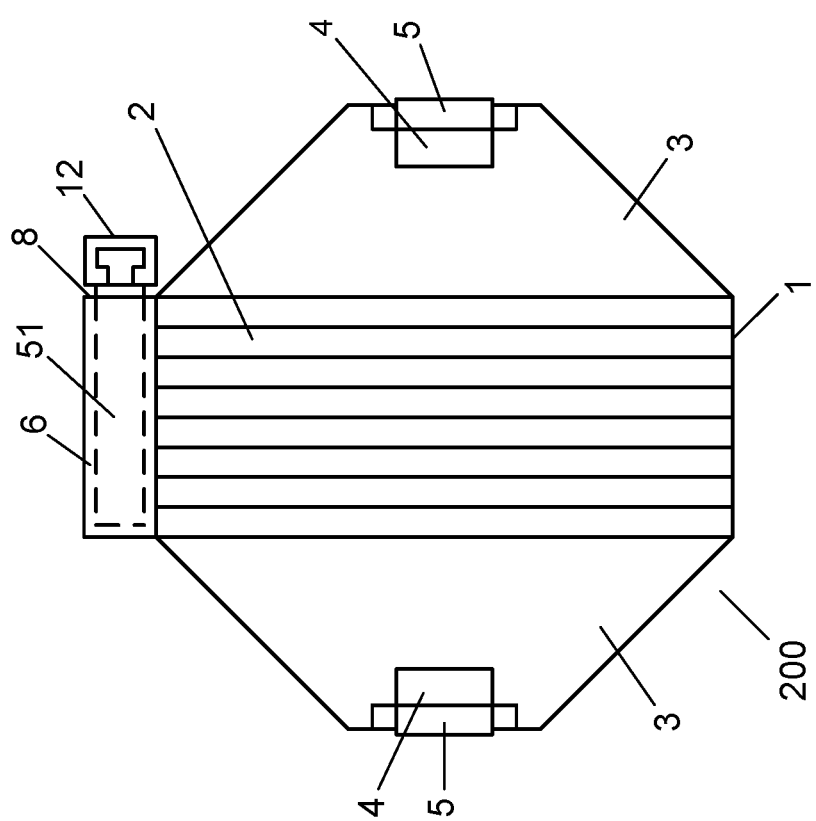
FIG. 6 illustrates the cover apparatus of FIG. 5 in a compressed state.

When it is desired to compress the telescopic shaft 51, such can be accomplished in a manner typically used when closing an umbrella. FIG. 6 illustrates the cover apparatus 200 with the telescopic shaft 51 in the fully compressed or non-use state or position.

Figure 7A:
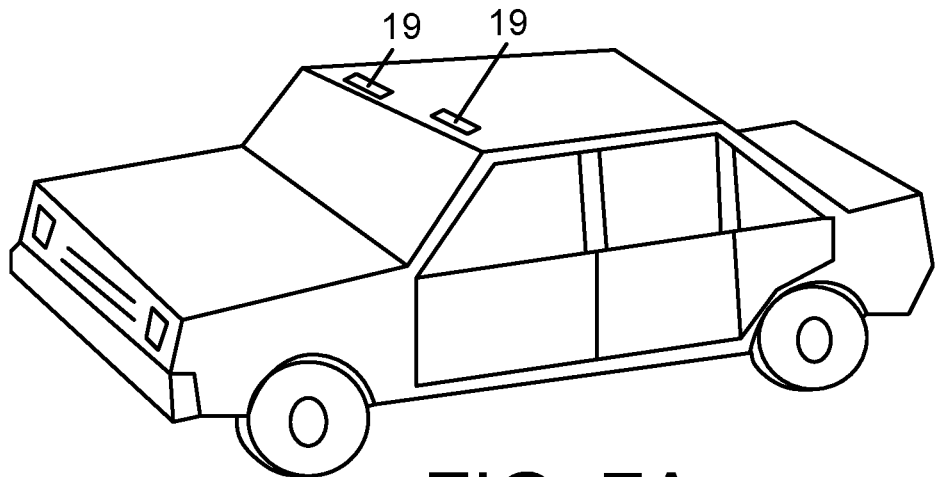
FIGS. 7A, 7B, 7C, and 7D illustrate a preferred embodiment method for applying the cover apparatus of the present invention to a vehicle.

FIGS. 7A, 7B, 7C, and 7D illustrate a preferred embodiment method for utilizing or applying the cover apparatus 100 of the present invention to a vehicle. FIG. 7A illustrates a vehicle to which the cover apparatus 100 can be applied. While FIG. 7A illustrates a conventional motor vehicle or automobile, it is important to note that the cover apparatus 100 of the present invention can also be utilized with any type, kind, or size, of motor vehicle, automobile, truck, van, passenger vehicle, commercial vehicle, or any other vehicle. FIG. 7A illustrates a typical motor vehicle.

When it is desired to apply the cover apparatus 100 to the vehicle, a user can place the shaft 11 of the support handle 10 into the cavity or passageway 7 of the top portion 6 of the sheet 1. In this manner, the user can create a rigid and straight top portion of the sheet 1 of the cover apparatus 100 which can allow the user to more easily handle the cover apparatus 100. The user can then, by holding the cover apparatus 100 by the handle 12 of the support handle 10, maneuver the cover apparatus 100 so as to place the top portion 6 of same on the top of the vehicle at an appropriate location on the vehicle roof and above the vehicle windshield. In this manner, the use of the support handle 10, in conjunction with the cover apparatus 100, allows for an easier positioning and placement of the cover apparatus 100 on the vehicle roof and over the vehicle windshield. In another preferred embodiment, wherein the cover apparatus 100 is equipped with cover handle 15, the user can also grasp the cover handle 15 in manipulating and/or in positioning the cover apparatus 100 on the vehicle roof and over the vehicle windshield.

Figure 7B:
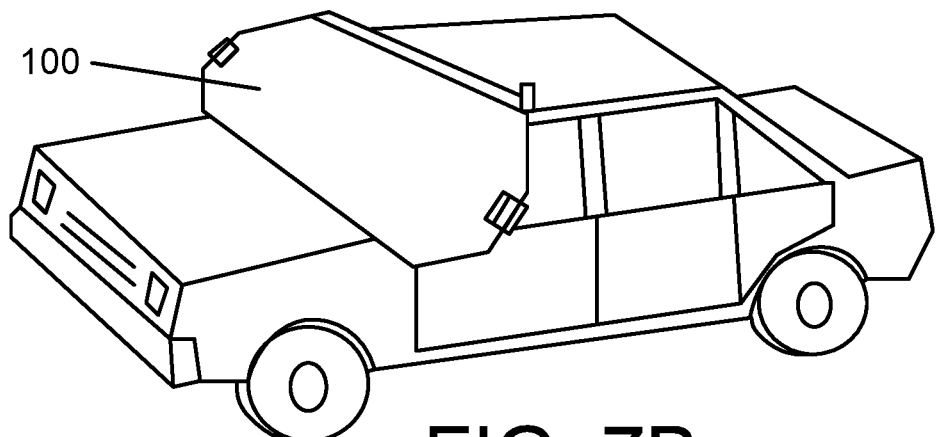

In an embodiment where the attachment elements 18 are utilized on or in connection with the cover apparatus 100, the vehicle can be equipped with corresponding attachment elements 19, which in a preferred embodiment can be strips of corresponding hook and loop type fasteners, or strips of VELCRO, or any other corresponding attachment, element which can mate with, or which can connect with, the attachment elements 18 of the cover apparatus 100. In this regard, when used in connection with attachment elements 18 and 19, the user should align or position the cover apparatus 100 so that the attachment elements 18 and 19 are lined up with one another so as to mate with or to connect with one another. FIG. 7B illustrates the vehicle of FIG. 7A with the cover apparatus 100 positioned on the portion of the vehicle roof adjacent to, and/or on or over the vehicle windshield, as shown.

Once the cover apparatus 100 has been applied to and/or positioned so that it covers the vehicle windshield, the user can, if desired, remove the shaft 11 of the support handle 10 from the cavity or passageway 7 of the top portion 6. The support handle 10 can then be stored, if desired. In a preferred embodiment, removal of the support handle 10 can also be desired in order to allow for an easy removal of the cover apparatus 100, as the cover apparatus 100, with the support handle 10 removed from the cavity or passageway 7, will be flexible and easy to pull off of the vehicle.

Figure 7C:
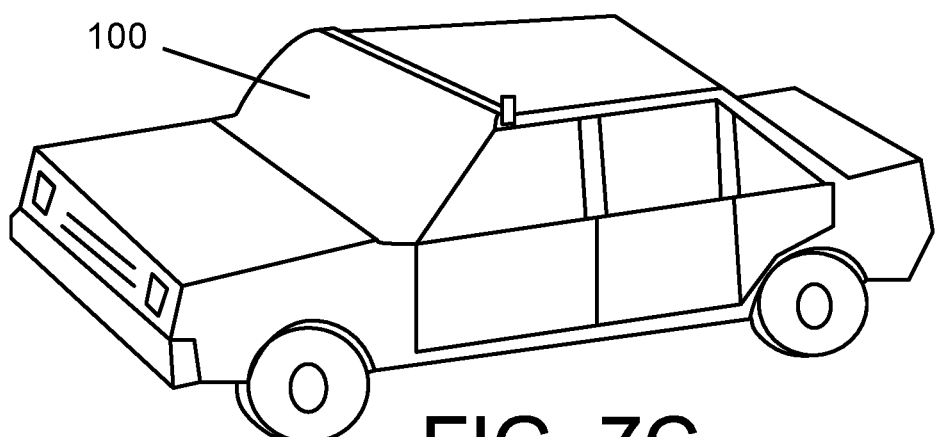
Figure 7D:
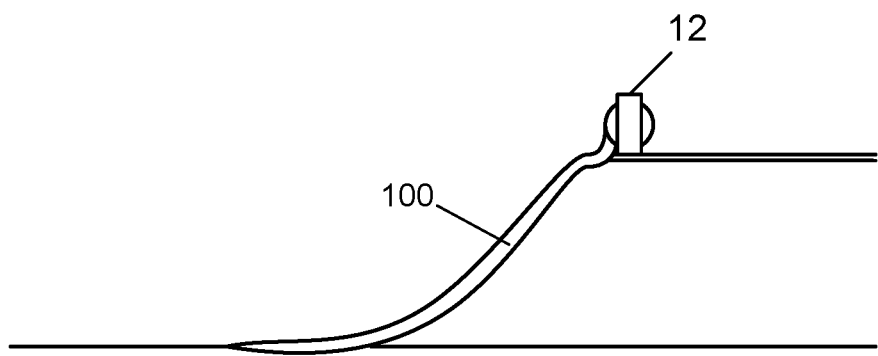

Once the cover apparatus 100 has been applied to and/or positioned so that it covers the vehicle windshield, the user can then open each front door of the vehicle, place the end region portion 3 adjacent to each door inside the passenger compartment of the vehicle door and close the door on the respective end portion 3 so as to secure each end portion 3 of the sheet 1, and the cover apparatus 100, to the vehicle. FIG. 7C illustrates the vehicle of FIG. 7A with the cover apparatus 100 of the present invention applied and secured thereto so as to provide a cover for the vehicle windshield. FIG. 7D illustrates a side view of the portion of the vehicle of FIG. 7A illustrating the placement of the cover apparatus 100 on the vehicle and over the vehicle windshield. Although the preferred embodiment of FIGS. 7A, 7B, 7C, and 7D have been described and illustrated as being used in connection with the cover apparatus 100, it is to be readily understood that the cover apparatus 200, or any other embodiment of the cover apparatus of the present invention, can be utilized in a same, a similar, and/or an analogous, manner as described herein in connection with the embodiment of FIGS. 7A, 7B, 7C, and 7D.

In a preferred embodiment, the cover apparatus 100 or 200 of the present invention can be utilized to protect a vehicle windshield from snow and ice so as to facilitate an easy clearing and/or cleaning of same after a snow event, an ice event, a rain event, or a freezing rain event. In this regard, the cover apparatus 100 or 200 can be placed on the vehicle before the snow event, the ice event, the rain event, or the freezing rain event. When it is desired to use the vehicle, or to simply clear the vehicle windshield, the user can simply open each vehicle from door and remove the end portions 3 form the passenger compartment and lift and/or remove the cover apparatus 100 from the vehicle. In a preferred embodiment, the user can simply lift and/or remove the cover apparatus 100 by grasping any portion of same. In another preferred embodiment, the user can grasp the handle 12 of the support handle 10 in order to maneuver the cover apparatus 100 from the vehicle. If the support handle 10 had been previously removed, the user can reinsert the support handle 10 into the cavity or passageway 7 of the top portion 6 prior to using the handle 12 of the support handle 10 to remove the cover apparatus 100. In another embodiment, if the cover apparatus 100 is equipped with the cover handle 15, the user can use the cover handle 15 and/or the handle 12 of the support handle 10 to remove the cover apparatus 100.

In another preferred embodiment, the cover apparatus 100 can also be used in the hot weather to provide a sunshade for the vehicle by placing the cover apparatus 100 over the vehicle windshield so as to prevent heat buildup in the car and/or so as to prevent sun damage to any portion of the vehicle interior.

The cover apparatus 100, by providing the handle support 10 for use in connection with same, facilitates an easier manipulation, placement, and/or positioning, of the cover apparatus 100 on the vehicle and on and over the vehicle windshield. The cover apparatus 100 can be utilized so as to dispense with the cumbersome activity of having to place and hold a cover over the vehicle windshield when trying the apply same to a vehicle.

In another preferred embodiment, a logo or advertisement can be placed on the front of the sheet 1 of the cover apparatus 100 in order to allow one to utilize the cover apparatus 100 as and for an advertisement and/or for advertising purposes.

The cover apparatus 100 can be used to provide protection for vehicle windshields which is quick and easy to use. In another preferred embodiment, the cover apparatus 100 of the present invention can also be adapted for use to provide protection and cover for rear windows, side windows, sunroofs, moon roofs, front lights, and/or rear lights.

In any and/or all of the embodiments described herein, the cover apparatus 100 or 200 can be manufactured to have a shell 1 which can contain one or more exterior side layers of material and/or one or more interior side layers of material. In another preferred embodiment, the cover apparatus 100 or 200 can be manufactured to have a soft and/or flannel-like material on its interior side so as to prevent causing scratches to the vehicle and/or to the vehicle windshield.

In any and/or all of the embodiments described herein, the sheet 1 can be manufactured from, or can include, a single layer of material, which can be a cloth material, a cloth fabric, a canvas material, a canvas fabric, a plastic material, or a vinyl material, or any other suitable material or fabric or any combination of same.

In any and/or all of the embodiments described herein, the sheet 1 can also be manufactured from, or can include, a plurality of, or any number of, layers of material, which can include, but not be limited, a cloth material, a cloth fabric, a canvas material, a canvas fabric, a plastic material, or a vinyl material, a flannel material or fabric, a rubber material, a cotton material or fabric, or polyester material or fabric, or any other suitable material or fabric or any combination or combinations of same.

In any and/or all of the embodiments described herein, the cover apparatus 100 or 200 of the present invention can also contain an advertisement or a logo anywhere on the sheet 1, the cover apparatus 100 or 200, or on any component of same.

In any and/or all of the embodiments described herein, the cover apparatus 100 or 200 of the present invention can also include, or can be utilized in conjunction with, any type of kind of attachment devices, elements, or systems, including, but not limited to, hook and loop fastening elements or systems, a strip(s) of VELCRO®, a magnet(s), a magnetic strip(s), or a flexible magnetic strip(s), for aiding in and/or for facilitating securing the cover apparatus 100 or 200 to a vehicle.

In any and/or all of the embodiments described herein, the support handle 10 can also be fixedly attached to, or sealed within, the top portion 6, with handle 12 extending from the cover apparatus 100 or 200 in any appropriate manner. In any and/or all of the embodiments described herein, the cover handle 15 can also be fixedly attached to, or can have a portion of same sealed within, the top portion 6, with a terminal portion of same extending from the cover apparatus 100 or 200.

The cover apparatus 100 or 200 of the present invention can be adapted for, and can be utilized for, covering vehicle windshields, side windows, rear windows, moon roofs, sunroofs, lights, indicator lamps, and/or any other vehicle component or device.

While the present invention has been described and illustrated in various preferred and alternate embodiments, such descriptions are merely illustrative of the present invention and are not to be construed to be limitations thereof. In this regard, the present invention encompasses all modifications, variations, and/or alternate, embodiments, with the scope of the present invention being limited only by the claims which follow.

What is claimed is:

1. An apparatus, comprising:
    a telescopic shaft, wherein the telescopic shaft is configured to expand in length or is configured to retract in length;
    a handle attached to the telescopic shaft; and
    a sheet, wherein the sheet is sized and shaped for being placed over, and for covering, a vehicle window of a vehicle and only a portion of a roof of the vehicle adjacent the vehicle window when the sheet is deployed over the vehicle window and secured to the vehicle, wherein the sheet further comprises:
        a main portion, wherein the main portion is configured to have a first side, a second side, a third side, and a fourth side, wherein the first side and the second side are positioned opposite one another, and further wherein the third side and the fourth side are positioned opposite one another, wherein the first side extends for a first length, the second side extends for a second length, the third side extends for a third length, and the fourth side extends for a fourth length, and further wherein the first length and the second length are each longer than the third length and the fourth length;
        at least two end portions, wherein a first end portion of the at least two end portions extends from the third side of the main portion and a second end portion of the at least two end portions extends from the fourth side of the main portion, wherein a portion of each of the at least two end portions is configured to be closed within a door of the vehicle to secure the sheet to the vehicle; and
        a top portion, wherein the top portion extends from and along the first side portion of the main portion, and further wherein the top portion contains a cavity or a passageway which extends along at least a portion of the first side of the main portion, and further wherein the cavity or the passageway of the top portion is configured to receive at least a portion of the telescopic shaft,
    wherein the at least a portion of the telescopic shaft is configured to be inserted into and within the cavity or the passageway of the top portion, and further wherein the at least a portion of the telescopic shaft is configured to be retracted in length while within the cavity or the passageway of the top portion.

2. The apparatus of claim 1, further comprising:
    a second handle, wherein the second handle is attached to the sheet.

3. The apparatus of claim 1, further comprising:
    a second handle, wherein the second handle is attached to the top portion of the sheet.

4. The apparatus of claim 1, further comprising:
    at least one attachment element attached to at least one side of the sheet.

5. The apparatus of claim 4, wherein the at least one attachment element is or includes a component of a hook and loop fastening system, a strip of VELCRO®, a magnet, a magnetic strip, or a flexible magnetic strip.

6. The apparatus of claim 1, wherein at least one side of the sheet contains an advertisement or a logo.

7. The apparatus of claim 1, wherein the sheet comprises a single layer of material.

8. The apparatus of claim 7, wherein the single layer of material is a cloth material or fabric, a flannel material or fabric, a canvas material or fabric, a cotton material or fabric, or a polyester material or fabric.

9. The apparatus of claim 7, wherein the single layer of material is a rubber material, a plastic material, or a vinyl material.

10. The apparatus of claim 1, wherein the sheet comprises a plurality of layers of material.

11. The apparatus of claim 1, wherein the cavity or the passageway has a first end and a second end, wherein the first end contains an opening configured to receive the telescopic shaft, and further wherein the second end is a closed end.

12. An apparatus, comprising:
    a telescopic shaft, wherein the telescopic shaft is configured to expand in length or is configured to retract in length;
    a first handle attached to the telescopic shaft; and
    a sheet, wherein the sheet is sized and shaped for being placed over, and for covering, a vehicle window of a vehicle and only a portion of a roof of the vehicle adjacent the vehicle window when the sheet is deployed over the vehicle window and secured to the vehicle, wherein the sheet further comprises:
        a main portion, wherein the main portion is configured to have a first side, a second side, a third side, and a fourth side, wherein the first side and the second side are positioned opposite one another, and further wherein the third side and the fourth side are positioned opposite one another, wherein the first side extends for a first length, the second side extends for a second length, the third side extends for a third length, and the fourth side extends for a fourth length, and further wherein the first length and the second length are each longer than the third length and the fourth length;
        at least two end portions, wherein a first end portion of the at least two end portions extends from the third side of the main portion and a second end portion of the at least two end portions extends from the fourth side of the main portion, wherein a portion of each of the at least two end portions is configured to be closed within a door of the vehicle to secure the sheet to the vehicle, and further wherein at least one end portion of the at least two end portions further comprises:
a second handle, wherein the second handle is located on or at an end region of the at least one end portion of the at least two end portions; and
a top portion, wherein the top portion extends from and along the first side portion of the main portion, and further wherein the top portion contains a cavity or a passageway which extends along at least a portion of the first side of the main portion, and further wherein the cavity or the passageway of the top portion is configured to receive at least a portion of the telescopic shaft,
wherein the at least a portion of the telescopic shaft is configured to be inserted into and within the cavity or the passageway of the top portion, and further wherein the at least a portion of the telescopic shaft is configured to be retracted in length while within the cavity or the passageway of the top portion.

13. The apparatus of claim 12, further comprising:
a third handle, wherein the third handle is attached to the sheet.

14. The apparatus of claim 12, further comprising:
a third handle, wherein the third handle is attached to the top portion of the sheet.

15. The apparatus of claim 12, further comprising:
at least one attachment element attached to at least one side of the sheet, wherein the at least one attachment element is or includes a component of a hook and loop fastening system, a strip of VELCRO®, a magnet, a magnetic strip, or a flexible magnetic strip.

16. An apparatus, comprising:
a shaft;
a handle attached to the shaft; and
a sheet, wherein the sheet is sized and shaped for being placed over, and for covering, a vehicle window of a vehicle and only a portion of a roof of the vehicle adjacent the vehicle window when the sheet is deployed over the vehicle window and secured to the vehicle, wherein the sheet further comprises:
a main portion, wherein the main portion is configured to have a first side, a second side, a third side, and a fourth side, wherein the first side and the second side are positioned opposite one another, and further wherein the third side and the fourth side are positioned opposite one another, wherein the first side extends for a first length, the second side extends for a second length, the third side extends for a third length, and the fourth side extends for a fourth length, and further wherein the first length and the second length are each longer than the third length and the fourth length;
at least two end portions, wherein a first end portion of the at least two end portions extends from the third side of the main portion and a second end portion of the at least two end portions extends from the fourth side of the main portion, wherein a portion of each of the at least two end portions is configured to be closed within a door of the vehicle to secure the sheet to the vehicle; and
a top portion, wherein the top portion extends from and along the first side portion of the main portion, and further wherein the top portion contains a cavity or a passageway which extends along at least a portion of the first side of the main portion, and further wherein the cavity or the passageway of the top portion is configured to receive at least a portion of the shaft,
wherein the at least a portion of the shaft is configured to be inserted into and within the cavity or the passageway of the top portion.

17. The apparatus of claim 16, further comprising:
a second handle, wherein the second handle is attached to the sheet or the to the top portion of the sheet.

18. The apparatus of claim 16, further comprising:
at least one attachment element attached to at least one side of the sheet, and further wherein the at least one attachment element is or includes a component of a hook and loop fastening system, a strip of VELCRO®, a magnet, a magnetic strip, or a flexible magnetic strip.

19. The apparatus of claim 16, wherein at least one side of the sheet contains an advertisement or a logo.

20. The apparatus of claim 16, further comprising:
a second handle, wherein the second handle is located at an end region of an end portion of the at least two end portions.

* * * * *